United States Patent [19]

Cummings et al.

[11] 4,132,531  
[45] Jan. 2, 1979

[54] DETERGENT ADDITIVE AND MOTOR FUEL COMPOSITION

[75] Inventors: William M. Cummings, Fishkill; Justin C. Powell, Wappingers Falls, both of N.Y.

[73] Assignee: Texaco Inc., New York, N.Y.

[21] Appl. No.: 861,463

[22] Filed: Dec. 16, 1977

[51] Int. Cl.$^2$ ................................................ C10L 1/22
[52] U.S. Cl. ............................................ 44/63; 44/71; 544/406
[58] Field of Search .................... 44/63, 71; 544/406

[56] References Cited

U.S. PATENT DOCUMENTS

| | | | |
|---|---|---|---|
| 2,632,009 | 3/1953 | Safir | 544/406 |
| 3,108,099 | 10/1963 | Felder et al. | 544/406 |
| 3,248,187 | 4/1966 | Bell | 44/63 |
| 3,997,569 | 12/1976 | Powell | 44/63 |

*Primary Examiner*—Winston A. Douglas
*Assistant Examiner*—Y. Harris-Smith
*Attorney, Agent, or Firm*—Thomas H. Whaley; Carl G. Ries; James J. O'Loughlin

[57] ABSTRACT

Detergent additive comprising the reaction product of anaminoakyl-substituted piperazine, and a hydrocarbyl-substituted acid lactone reaction product, and a motor fuel composition containing the detergent additive.

8 Claims, No Drawings

DETERGENT ADDITIVE AND MOTOR FUEL COMPOSITION

BACKGROUND OF THE INVENTION

1. Field of the Invention

Modern internal combustion engine design is undergoing important changes to meet stricter standards concerning engine and exhaust gas emissions. One major change in engine design is the feeding of blow-by gases from the crankcase zone of the engine into the intake airfuel mixture at the carburetor just below the throttle plate, rather than venting these gases to the atmosphere as in the past. The blow-by gases contain substantial amounts of deposit forming substances and are known to form deposits in and around the throttle plate area of the carburetor. Another significant change is the recirculation of a part of the exhaust gases to the fuel air intake of the engine. These exhaust gases also have deposit forming tendencies. The deposits caused by the recirculated gases both blow-by and exhaust gases restrict the flow of air through the carburetor at idle and at low speeds so that an overrich fuel mixture results. This condition produces rough engine idling and leads to the release of excessive hydrocarbon exhaust emissions to the atmosphere.

Certain gamma and delta acid lactones or mixtures thereof have been described as corrosion inhibitors for hydrocarbon oils boiling from about 75 to 900° F. These materials were obtained by reacting an alkenyl-substituted succinic acid, such as tetrapropenyl succinic acid, with a dilute mineral acid at a temperature ranging from about 100 to 212° F to effect internal esterification of the alkenylsuccinic acid to form the acid lactone reaction product. While the structure of individual acid lactones has been postulated because of the variety of positions of the olefinic bond in the alkenyl radical and the further fact that internal esterification of alkenyl succinic acid takes different paths leading to both five and six-membered ring structures, the product obtained from the foregoing reaction are complex mixture of five- and six-membered hydrocarbon substituted lactones, each five- and six-membered type exhibiting a variety of structural configurations.

2. Description of the Prior Art

U.S. Pat. No. 3,248,187 discloses a hydrocarbon oil composition, such as gasoline, which has been inhibited against rust by the addition thereto of acid lactone reaction product. Gamma and delta lactones derived from an alkenyl-substituted succinic acid are specifically disclosed.

U.S. Pat. No. 3,997,569 discloses a method for preparing a certain substituted acid lactone reaction products which are useful in a motor fuel composition.

SUMMARY OF THE INVENTION

The additive of the invention, which is effective as a carburetor detergent in gasoline comprises the reaction product of a substituted piperazine and a hydrocarbon substituted lactone reaction product which, in turn, is produced by reacting an alkenylsuccinic acid with an acid catalyst or protonating agent under substantially anhydrous esterification conditions.

The motor fuel composition of the invention comprises a mixture of hydrocarbons in the gasoline boiling range containing a minor amount of the reaction product of a substituted piperazine and an alkenyl-substituted acid lactone reaction product.

More specifically, the detergent additive of the invention is the reaction product of a substituted piperazine represented by the formula:

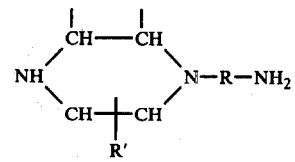

in which R is a hydrocarbyl radical having from 2 to 4 carbon atoms and R' is hydrogen or an alkyl radical having from 1 to 3 carbon atoms, and a hydrocarbon-substituted acid lactone reaction product, said hydrocarbon-substituted acid lactone reaction product being the reaction product of an alkenyl-succinic acid, in which the alkenyl radical has a molecular weight from about 300 to 3000, which has been reacted with a concentrated mineral acid or protonating agent under substantially anhydrous reaction conditions at a temperature from about 50° to 100° C.

PREPARATION OF THE INTERMEDIATE REACTION PRODUCT

The starting reactant from which the first reaction product is obtained is an alkenylsuccinic acid represented by the formula:

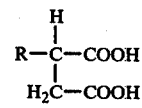

in which R is an alkenyl radical having a molecular weight ranging from about 300 to 3000. The alkenyl radical itself is derived from the polymerization of propylene or isobutylene or mixtures thereof until a polymer of from about 300 to 3000 average molecular weight preferably from about 700 to 2000 average molecular weight is produced. This is reacted with maleic anhydride to produce an alkenylsuccinic anhydride which is thereafter hydrolyzed to an alkenyl succinic acid. The polymerization of olefins, the reaction of the olefin polymer with maleic anhydride and subsequent hydrolysis to alkenylsuccinic acid are well known conventional processes and require no detailed description here.

The prescribed alkenylsuccinic acid is mixed with a catalyst to form a reaction mixture which is heated to an elevated temperature to effect lactone formation.

The catalyst which is employed may be any protonating agent or electron pair acceptor i.e., any material which can provide a hydrogen ion or accept a pair of electrons to catalyze the reaction. The protonating agent or electron pair acceptor employed should provide from about 0.25 to 1.5 moles of protons or electrons acceptors per mole of the alkenylsuccinic acid bein reacted although smaller or larger amounts can be employed with compromises in efficiency and/or economy. It is preferred to employ a protonating agent or electron pair acceptor which provides from about 0.5 to 1 moles of proton or electron pair acceptor per mole of alkenylsuccinic acid. These ranges can be also expressed as 0.25 to 1.5 or 0.5 to 1 equivalents of acid per mole of the alkenylsuccinic acid moiety.

A variety of protonating agents or electron pair acceptors can be employed in the noted process. Included among these are mineral acids such as sulfuric acid and perchloric acid. Organic acids, including p-toluene sulfonic acid hydrate, boron trifluoride etherate and solid sulfonic acid ion exchange resins are also suitable.

The reaction is normally conducted at a temperature ranging from about 50° C up to about 100° C with a range from about 60 to 100° C being especially suitable. A preferred temperature range for this process is from about 70 to 98° C.

In important feature in the first step for preparing the additive of the invention is that it be conducted under substantially anhydrous conditions. The reactant solvent and the catalyst or the protonating agent must all be selected so as to insure substantially anhydrous and preferably anhydrous reaction conditions. By substantially anhydrous reaction conditions is meant that the reaction mixture should contain no more than about 5 percent water. It is preferred that this mixture contain no more than about 2 percent water with the most preferred situation being an essentially anhydrous reaction mixture.

The formation of the hydrocarbyl substituted 5- and 6-membered ring lactone reaction product is shown by infrared radiation at 5.66 and 5.78 micrometer regions. Thus, by infrared analysis or a correlated reaction time, it is possible to insure conversion of a major portion or substantially all of the alkenylsuccinic acid to lactone reaction product.

It will be understood that the prescribed alkenyl succinic acid reactant can be prepared from the corresponding alkenylsuccinic anhydride. In this case, an alkenylsuccinic anhydride and water are reacted in equimolar amounts to form the prescribed alkenylsuccinic acid reactant in accordance with known methods.

The following examples illustrate the preparation of the hydrocarbyl-substituted acid lactone reaction product.

EXAMPLE I

POLYISOBUTENYL ACID LACTONE REACTION PRODUCT

To a solution of 126 g (0.025 mole) of crude polyisobutenylsuccinic acid (the precursor succinic anhydride prepared from polyisobutene of about 1300 molecular weight and maleic anhydride by thermal alkenylation with about 50% unreacted polyisobutene) in a 50 weight percent oil solution was added 1.25 g. (0.0125 mole) of concentrated sulfuric acid.

The mixture contained about 0.0125 moles of sulfuric acid or about 0.025 moles of available protons. This mixture was reacted at 90° C for three hours. Infrared analysis of the product from the foregoing reaction showed a high conversion to five-and-six membered lactones, with the yield estimated to be greater than 85 mole percent.

EXAMPLE II

A mixture of 2,570 g. (1.0 mole) of crude polyisobutenylsuccinic anhydride (containing about 50% unreacted polyisobutene of about 1300 average molecular weight) and 25 g. (0.25 mole) of about 96% aqueous sulfuric acid and 18 g. (1.0 mole) of water were heated and stirred at 90° C. for about one hour and then allowed to cool to room temperature. The excess mineral acid can be removed by extraction but the product can also be used without further purification. Infrared analysis indicated high conversion to lactones as in Example I.

EXAMPLE III

A mixture of 824 g. (0.55 mole) of crude polyisobutenylsuccinic anhydride (containing about 45% unreacted polybutene of about 625 average molecular weight) is heated to about 90° C with stirring. Over a period of about four minutes, 21.5 g. of a solution consisting of 12.5 g. of about 96% sulfuric acid and 9.0 g. (0.5 mole) of water is added dropwise. After four hours the mixture is allowed to cool. This product will exhibit strong lactone absorptions in its infrared spectrum similar to Example I.

EXAMPLE IV

A mixture of 377.5 g. (0.5 mole) of crude polyisobutenylsuccinic anhydride (containing about 31% unreacted polyisobutene of about 335 average molecular weight), 12.5 g. (0.125 mole) of about 96% sulfuric acid, and 9.0 g. (0.5 mole) of water are heated to about 90° C. with stirring for about an hour and allowed to cool. The product is washed free of mineral acidity by extraction and yields about 360 g. after handling-solvent evaporation. This product is characterized by a Sap. No. of about 157, a Neut. No. of about 110; contains about 0.19% sulfur and exhibits strong lactone absorption in its infrared spectrum similar to the product of Example I.

PREPARATION OF THE ADDITIVE REACTION PRODUCT

In the second step for preparing the additive composition of the invention, an acid lactone reaction product from the first step is reacted with the prescribed piperazine to produce a reaction product characterized as an amide.

More specifically, a substituted piperazine represented by the formula:

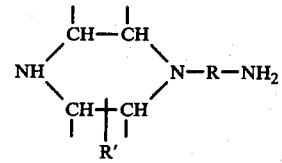

in which R is a hydrocarbyl radical having from 2 to 4 carbon atoms and R' is hydrogen or an alkyl radical having from 1 to 3 carbon atoms, the remaining open bonds being satisfied by hydrogen, is reacted with an acid lactone reaction product described in the first step above at a temperature above 100° C to produce an amide reaction product. In general, the reaction temperature should range from above 100° C to 170° C to effect amidation with the removal of water. The preferred reaction temperature range is from about 120 to 150° C. The course of this reaction can be followed by collecting the water removed in the reaction until the stoichiometrical amount of water has been collected.

The particular substituted piperazines which are employed for preparing the additive of the invention are generically described as aminoalkylpiperazines. Typical reactants include aminoethylpiperazine, aminopropylpiperazine, aminobutylpiperazine, etc.

It is convenient to conduct this reaction in an inert diluent or solvent which will facilitate refluxing of the reactant within the indicated temperature range. In general, an inert hydrocarbon or mixture of hydrocarbons which is an effective solvent for the reactants and of a suitable boiling range is the preferred medium for effecting this reaction.

The substituted piperazine and the substituted lactone reaction product are reacted employing approximately equimolar amounts of each reactant. These proportions can be varied somewhat but without advantage since the reactant in excess generally remains unreacted. Thus, the proportion of reactants employed is conveniently expressed as from about 1 mole of the substituted piperazine per mole of the hydrocarbyl or hydrocarbon-substituted lactone reaction product. It will be appreciated that the hydrocarbon radical on the substituted lactone reaction product can be saturated on unsaturated and that in either case the hydrocarbon or alkenyl radical will have approximately the same average molecular weight i.e., about 300 to 3000 in its broadest scope and from about 300 to 2000 in the preferred range.

The following examples illustrate the preparation of the additive reaction product of the invention.

EXAMPLE V

POLYISOBUTENYL (335) LACTONO-AMINOETHYL PIPERAZINE REACTION PRODUCT

To 700 g of a product described in Example IV in 700 ml of xylene was added 115 g aminoethyl piperazine and this mixture heated at reflux for six hours while continuously removing water. The reaction mixture was cooled, filtered to remove solids, and the xylene then removed under reduced pressure. The additive analysed as shown below:

Sap. No.: 55.7
Neut. No.: 16.2
Mod. Naphtha Neut. No.: 12.0
Total Base No.: 132
Nitrogen, %: 4.4
Sulfur, %: 0.25

The base fuel which is useful for employing the additive of the invention is a motor fuel composition comprising a mixture of hydrocarbons boiling in the gasoline boiling range. This base fuel may consist of straight-chain or branched-chain paraffins, cycloparaffins, olefins, and aromatic hydrocarbons and any mixture of these. The base fuel can be derived from straight-run naphtha, polymer gasoline, natural gasoline or from catalytically cracked or thermally cracked hydrocarbons and catalytically reformed stocks and boils in the range from about 80° to 450° F. The composition and the octane level of the base fuel are not critical. Any conventional motor fuel base may be employed in the practice of this invention.

In general, the additive of the invention is added to the base fuel in a minor amount, i.e., an amount effective to provide carburetor detergency to the fuel composition. The additive is highly effective in an amount ranging from about 0.003 to 0.25 weight percent based on the total fuel composition. An amount ranging from about 0.003 to 0.15 weight percent is preferred with the most preferred concentration ranging from about 0.005 to 0.10 weight percent.

The fuel composition of the invention may contain any of the additives normally employed in a motor fuel. For example, the base fuel may be blended with an anti-knock compound, such as a tetraalkyl lead compound, including tetraethyl lead, tetramethyl lead, tetrabutyl lead, and chemical and physical mixtures thereof, generally in a concentration from about 0.05 to 4.0 cc. per gallon of gasoline. The tetraethyl lead mixture commercially available for automotive use contains an ethylene chloride-ethylene bromide mixture as a scavenger for removing lead from the combustion chamber in the form of a volatile lead halide. The motor fuel composition may also be fortified with any of the conventional anti-icing additives, corrosion inhibitors dyes and the like.

Gasoline blends were prepared consisting of one of the above base fuels mixed with specified amounts of the prescribed fuel additive. The additive of the invention was tested for effectiveness in gasoline in the following performance tests.

The additive of the invention was tested for its effectiveness as a carburetor detergent in the Carburetor Detergency Test. This test is run on a Chevrolet V-8 engine mounted on a test stand using a modified four barrel carburetor. The two secondary barrels of the carburetor are sealed and the feed to each of the primary barrels arranged so that an additive fuel can be run in one barrel and the base fuel run in the other. The primary carburetor barrels were also modified so that they had removable aluminum inserts in the throttle plate area in order that deposits formed on the inserts in this area would be conveniently weighed.

In the procedure designed to determine the effectiveness of an additive fuel to remove preformed deposits in the carburetor, the engine is run for period of time usually 24 to 48 hours using the base fuel as the feed to both barrels with engine blow-by circulated to an inlet in the carburetor body. The weight of the deposits on both sleeves is determined and recorded. The engine is then cycled for 24 additional hours with a suitable reference fuel being fed to one barrel, additive fuel to the other and blowby to the inlet in the carburetor body. The inserts are then removed from the carburetor and weighed to determine the difference between the performance of the additive and reference fuels in removing the preformed deposits. After the aluminum inserts are cleaned, they are replaced in the carburetor and the process repeated with the fuels reversed in the carburetor to minimize differences in fuel distribution and barrel construction. The deposit weights in the two runs are averaged and the effectiveness of the fuel composition of the invention is compared to the reference fuel which contains an effective detergent additive. The difference in effectiveness is expressed in percent, a positive difference indicating that the fuel composition of the invention was more effective than the commercial fuel composition.

The base fuel employed with the detergent additive of the invention in the following examples was a premium grade gasoline having a Research Octane Number of about 91 and containing 3.0 cc of tetraethyl lead per gallon. This gasoline consisted of about 30% aromatic hydrocarbons, 2.5% olefinic hydrocarbons and 67.5% paraffinic hydrocarbons and boiled in the range from 90° F to 360° F.

The carburetor detergency test results obtained with the fuel composition of the invention in comparison to two premium commercial fuel compositions referred to as Reference A and Reference B, are set forth in the table below.

TABLE I

| | CARBURETOR DETERGENCY TEST | |
|---|---|---|
| Run | Additive Fuel Composition | % Effective |
| 1. | Base Fuel + 20 PTB of Additive vs 15 PTB Ref A | +20 |
| 2. | Base Fuel + 40 PTB of Additive vs 172 PTB Ref B | −14 |

PTB = Pounds of Additive per 1000 barrels of fuel.

The foregoing tests show that the fuel composition of the invention possesses a high level of carburetor detergency and is suitable for use as a premium fuel composition.

We claim:

1. An additive composition comprising an amine reaction product obtained by reacting a substituted piperazine represented by the formula:

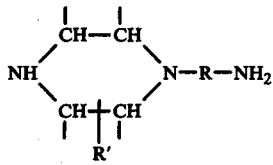

in which R is a hydrocarbyl radical having from 2 to 4 carbon atoms and R' is hydrogen or an alkyl radical having from 1 to 3 carbon atoms with an acid lactone reaction product at a temperature in the range from above 100° to 170° C employing about one mole of said piperazine per mole of said acid lactone reaction product, said acid lactone reaction product being obtained by reacting an alkenyl succinic acid, represented by the formula:

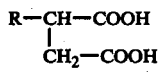

in which R is an alkenyl radical having an average molecular weight ranging from about 300 to 3000, under substantially anhydrous esterification conditions at a temperature ranging from about 50 to 100° C in the presence of a protonating agent.

2. An additive composition according to claim 1 in which said piperazine is N-aminoethylpiperazine.

3. An additive composition according to claim 1 in which said piperazine is N-aminopropylpiperazine.

4. An additive composition according to claim 1 in which said piperazine is N-aminobutylpiperazine.

5. A motor fuel composition comprising a mixture of hydrocarbons in the gasoline boiling range containing an effective detergent amount of an additive composition comprising the reaction product obtained by reacting a substituted piperazine represented by the formula:

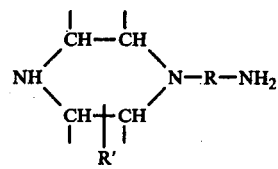

in which R is a hydrocarbyl radical having from 2 to 4 carbon atoms and R' is hydrogen or an alkyl radical having from 1 to 3 carbon atoms with an acid lactone reaction product, at a temperature in the range from about 100° C to 170° C employing about one mole of said piperazine per mole of said acid lactone reaction product, said acid lactone reaction product being obtained by reacting an alkenyl succinic acid, represented by the formula:

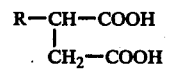

in which R is an alkenyl radical having an average molecular weight ranging from about 300 to 3000, under substantially anhydrous esterification conditions at a temperature ranging from about 50 to 100° C in the presence of a protonating agent.

6. A motor fuel composition according to claim 5 containing from about 0.003 to 0.25 weight percent of said additive.

7. A motor fuel composition according to claim 5 containing from about 0.03 to 0.10 weight percent of said additive.

8. An additive composition according to claim 5 in which R has an average molecular weight from about 300 to 2000.

* * * * *